(12) United States Patent
Chu

(10) Patent No.: US 8,375,198 B2
(45) Date of Patent: *Feb. 12, 2013

(54) BOOT SYSTEM AND METHOD HAVING A BIOS THAT READS AN OPERATING SYSTEM FROM FIRST STORAGE DEVICE VIA AN INPUT/OUTPUT CHIP BASED ON DETECTING A TEMPERATURE OF A SECOND STORAGE DEVICE

(75) Inventor: Ping-Ying Chu, Hsinchu (TW)

(73) Assignee: Nuvotron Technology Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,970

(22) Filed: Mar. 28, 2012

(65) Prior Publication Data

US 2012/0191965 A1    Jul. 26, 2012

Related U.S. Application Data

(63) Continuation of application No. 12/437,249, filed on May 7, 2009, now Pat. No. 8,176,309.

(51) Int. Cl.
*G06F 15/177* (2006.01)
(52) U.S. Cl. .......................................... 713/2; 714/4.11
(58) Field of Classification Search ...... 713/2; 714/4.11
See application file for complete search history.

(56) References Cited

U.S. PATENT DOCUMENTS

| | | | |
|---|---|---|---|
| 6,230,285 B1 | 5/2001 | Sadowsky et al. | |
| 6,381,694 B1 | 4/2002 | Yen | |
| 6,421,792 B1 | 7/2002 | Cromer et al. | |
| 6,754,818 B1 | 6/2004 | Lee et al. | |
| 6,880,110 B2 | 4/2005 | Largman et al. | |
| 6,931,525 B2 | 8/2005 | Numata et al. | |
| 7,137,034 B2 | 11/2006 | Largman et al. | |
| 7,146,521 B1* | 12/2006 | Nguyen | ............................ 714/2 |
| 7,265,578 B1 | 9/2007 | Tang et al. | |
| 7,849,300 B2 | 12/2010 | Hsu et al. | |
| 8,176,309 B2* | 5/2012 | Chu | ................................ 713/2 |
| 8,200,358 B2* | 6/2012 | Sendelbach et al. | .......... 700/153 |
| 2004/0230702 A1 | 11/2004 | Sukigara | |
| 2004/0255106 A1 | 12/2004 | Rothman et al. | |
| 2007/0219644 A1* | 9/2007 | Sonobe | ......................... 700/12 |
| 2008/0052507 A1 | 2/2008 | Chow et al. | |
| 2008/0229005 A1 | 9/2008 | Iyer et al. | |
| 2009/0094447 A1 | 4/2009 | Yang et al. | |
| 2009/0138694 A1 | 5/2009 | Le et al. | |
| 2009/0222807 A1 | 9/2009 | Fu et al. | |
| 2010/0082962 A1 | 4/2010 | Srinivasan et al. | |

* cited by examiner

*Primary Examiner* — Chun Cao
(74) *Attorney, Agent, or Firm* — Muncy, Geissler, Olds & Lowe, PLLC

(57) ABSTRACT

Boot systems and methods are provided. The boot system includes an IO (Input/Output) chip, a memory device, and a BIOS (Basic Input/Output System). The memory device is coupled to the IO chip, and includes at least a rescue OS (Operating System). The BIOS reads the rescue OS from the memory device via the IO chip, and boots an electronic device based on the rescue OS.

9 Claims, 4 Drawing Sheets

BOOT SYSTEM AND METHOD HAVING A BIOS THAT READS AN OPERATING SYSTEM FROM FIRST STORAGE DEVICE VIA AN INPUT/OUTPUT CHIP BASED ON DETECTING A TEMPERATURE OF A SECOND STORAGE DEVICE

CROSS REFERENCE TO RELATED APPLICATIONS

This application is a Continuation of application Ser. No. 12/437,249 filed May 7, 2009, now U.S. Pat. No. 8,176,309, the entirety of which is incorporated by reference herein.

BACKGROUND OF THE INVENTION

1. Field of the Invention

The disclosure relates generally to boot systems and methods, more particularly to boot systems and methods using an input/output chip of an electronic device, and related devices.

2. Description of the Related Art

Generally, an OS (Operating System) must be in a data storage device, such as hard disc of a computer system. The OS includes hardware drivers and applications used to boot the computer system, and provides functions when the computer system operates.

A recovery disc is always provided with a computer system. When the computer system has a malfunction, for example, the hard disk or OS of the computer is damaged, or files in the hard disk are infected with computer viruses, such that the computer system cannot boot or results in abnormal operation, the recovery disc can be used to boot the computer system, and recover the OS of the computer system. However, if the recovery disc is lost or a disc drive of the computer system cannot be driven to read data of the recovery disc, the computer system cannot be successfully recovered.

Additionally, in some conventional practices, a computer system may have a hard disk including multiple partitions or several hard disks. Various Oss can be stored in the respective partitions/hard disks. When an OS of a specific partition/hard disk malfunctions, another partition/hard disk can be switched to, and the computer system can be booted according to the OS therein. However, in these conventional practices, additional hard disk capacity is required to store the backup OS, thus increasing the cost of the computer system.

BRIEF SUMMARY OF THE INVENTION

Boot systems and methods and related boot devices are provided.

An embodiment of a boot system includes an IO (Input/Output) chip, a memory device, and a BIOS (Basic Input/Output System). The memory device is coupled to the IO chip, and includes at least a rescue OS (Operating System). The BIOS reads the rescue OS from the memory device via the IO chip, and boots an electronic device based on the rescue OS.

In an embodiment of a boot method, a rescue OS is first read from a memory device via an IO chip. Then, an electronic device is booted based on the rescue OS.

An embodiment of a boot device includes an IO chip and a memory device. The memory device is coupled to the IO chip, and includes at least a rescue OS. The rescue OS in the memory device is read and executed via the I/O chip, thus to boot an electronic device.

Boot systems and methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Boot systems and methods, and related boot devices are provided.

Figure 1:
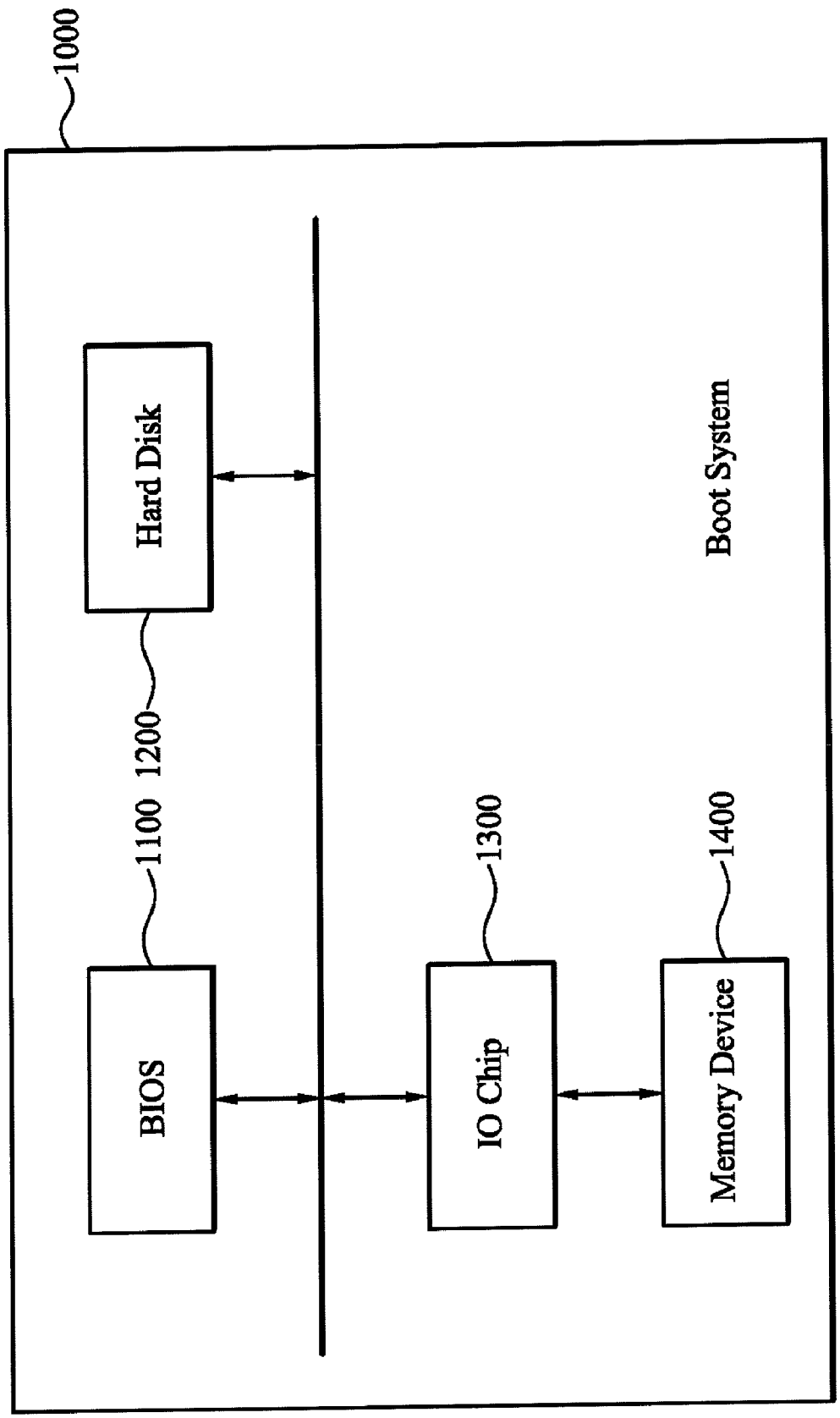
FIG. 1 is a schematic diagram illustrating an embodiment of a boot system of the invention.

FIG. 1 is a schematic diagram illustrating an embodiment of a boot system of the invention.

Figure 2:
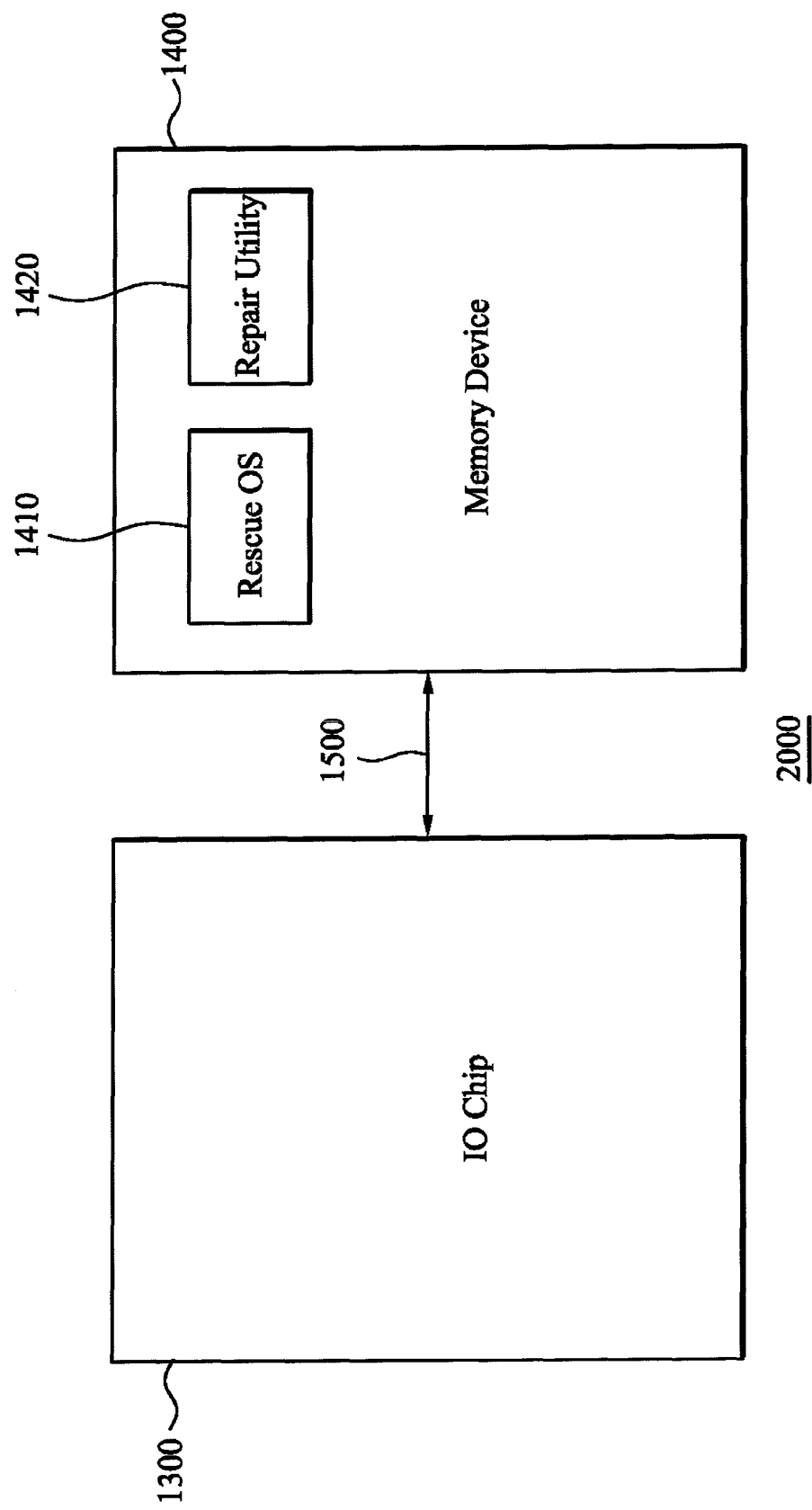
FIG. 2 is a schematic diagram illustrating an embodiment of a boot device of the invention.

The boot system 1000 can be used in an electronic device, such as a computer system. The boot system 1000 comprises a BIOS (Basic Input/Output System) 1100, a hard disk 1200, an IO (Input/Output) chip 1300, and a memory device 1400. The BIOS 1100 is a firmware stored in a ROM (Read Only Memory) on the motherboard of the computer system. The BIOS 1100 can control basic input/output of the computer system, configure the computer system, and perform hardware tests and other functions. The hard disk 1200 can comprise an original OS (Operating System), and corresponding system files and applications (not shown in FIG. 1). The hard disk 1200 may be the master boot device of the electronic device. That is, in general situations, the BIOS 1100 can control the electronic device to boot from the hard disk 1200, and boots the electronic device according to the original OS in the hard disk 1200. The IO chip 1300 and the memory device 1400 can be integrated as a boot device. FIG. 2 is a schematic diagram illustrating an embodiment of a boot device of the invention. As shown in FIG. 2, the boot device 2000 comprises the IO chip 1300 and the memory device 1400. The IO chip 1300 may be a super IO or a keyboard controller. The memory device 1400 may be a flash memory coupled to the IO chip 1300 via an interface 1500, such as a SPI (Serial Peripheral Interface) NVM (Non-Volatile Memory) interface. It is understood that, the memory device 1400 is not limited to any type of flash memory, and the interface between the IO chip 1300 and the memory device 1400 may be variety based on the type of flash memory. The above interface is an example of the application, and the invention is not limited thereto. The memory device 1400 can comprise a rescue OS 1410, a repair utility 1420, and/or drivers (not shown) for the hardware of the electronic device. The rescue OS 1410 and the repair utility 1420 can be used to boot the electronic device. Related details will be discussed further in the following paragraphs.

Figure 3:
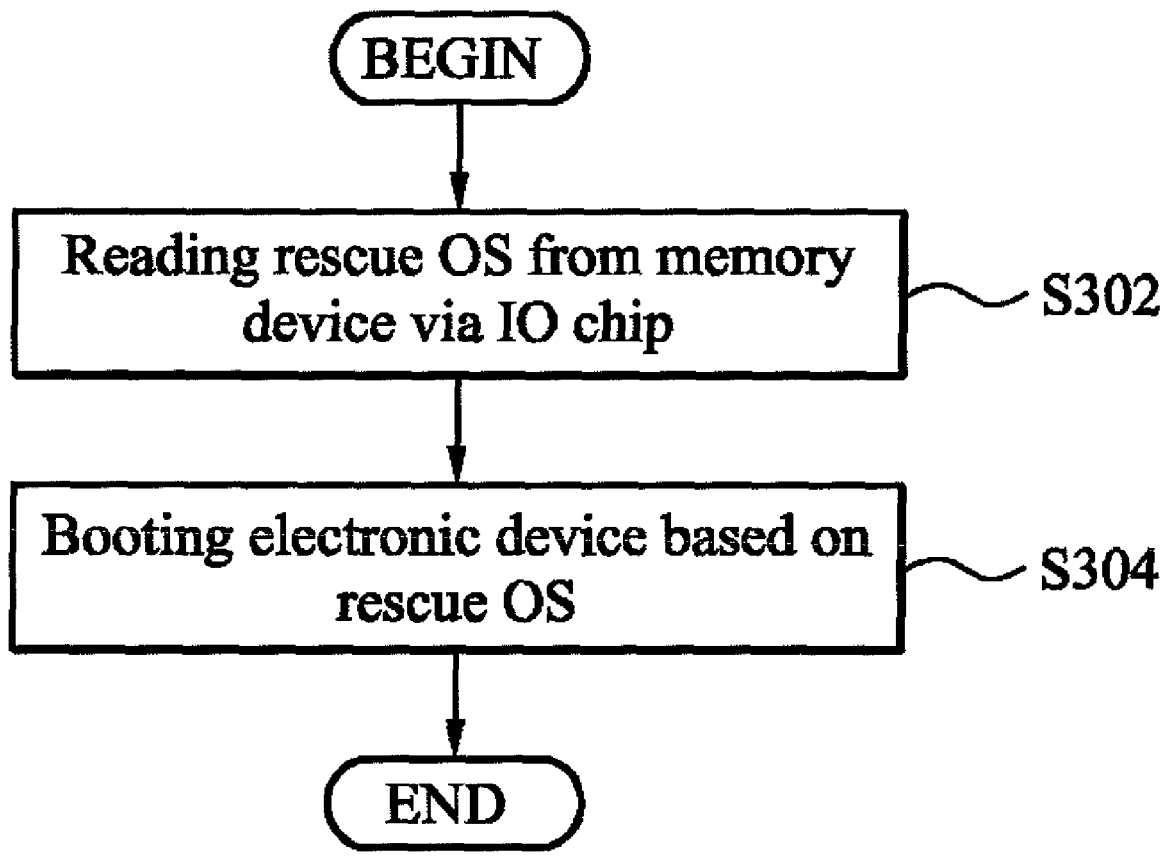
FIG. 3 is a flowchart of an embodiment of a boot method of the invention.

FIG. 3 is a flowchart of an embodiment of a boot method of the invention. The boot method can be used in an electronic device, such as a computer system.

In step S302, the rescue OS 1410 is read from the memory device 1400 via the IO chip 1300. Then, in step S304, the rescue OS 1410 is executed to boot the electronic device.

It is noted that, as described, in general situations, the BIOS 1100 controls the booting of the electronic device by the hard disk 1200. Therefore, when the hard disk 1200 cannot be detected by the BIOS 1100, the embodiment in FIG. 3 is performed. Additionally, in some embodiments, the boot system 1000 can further comprise a temperature sensor to detect the temperature of the hard disk 1200. When the temperature of the hard disk 1200 exceeds a predefined value, the embodiment in FIG. 3 is performed. Further, in some embodiments, the BIOS 1100 can provide a multi-boot menu. Users can select a location, such as the hard disk 1200 or the memory device 1400 to boot the electronic device via the multi-boot menu. When the memory device 1400 is selected, the embodiment in FIG. 3 is performed.

Figure 4:
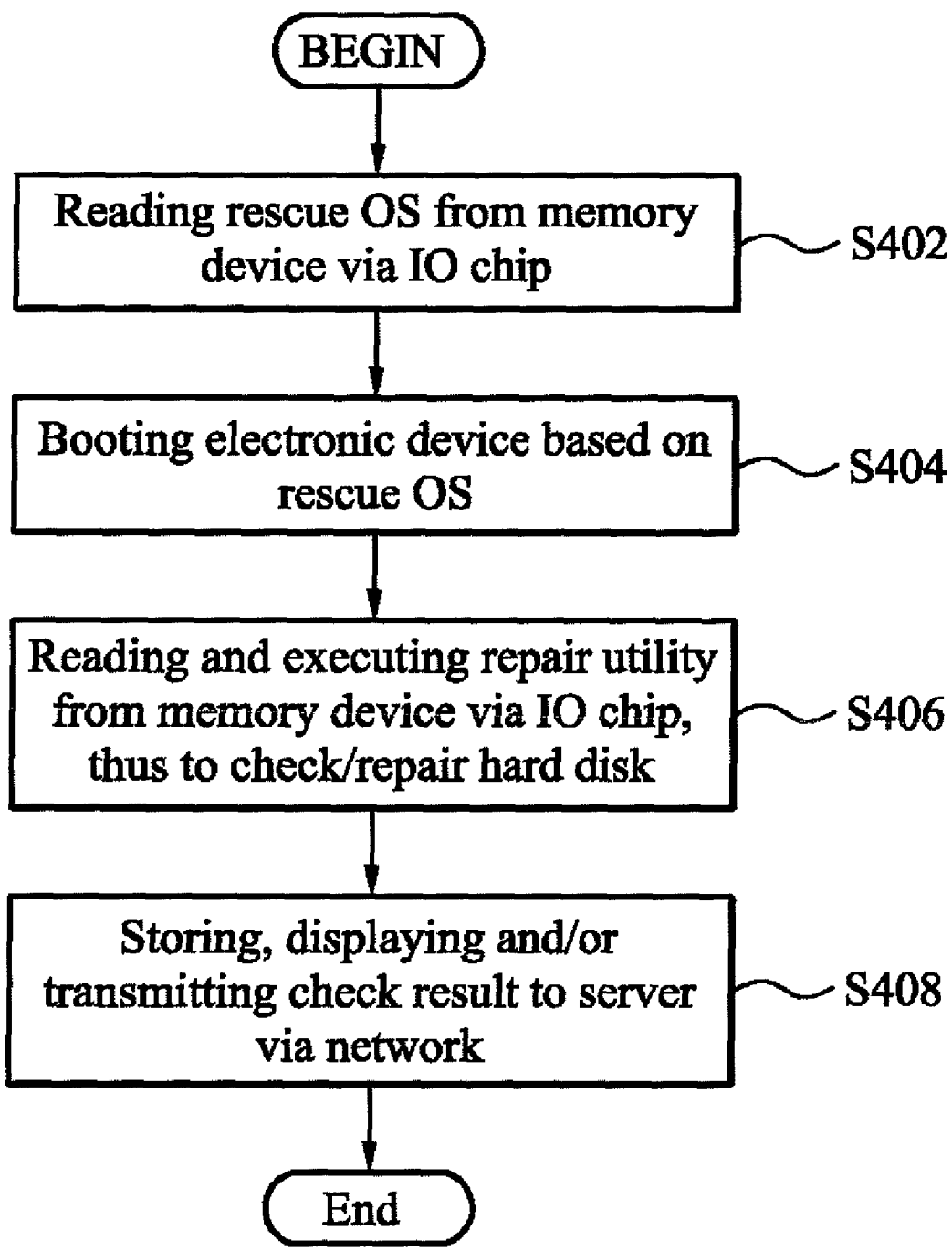
FIG. 4 is a flowchart of another embodiment of a boot method of the invention.

FIG. 4 is a flowchart of another embodiment of a boot method of the invention. The boot method can be used in an electronic device, such as a computer system.

In step S402, the rescue OS 1410 is read from the memory device 1400 via the IO chip 1300. In step S404, the rescue OS 1410 is executed to boot the electronic device. Then, in step S406, the repair utility 1420 is read and executed from the memory device 1400 via the IO chip 1300, thus to check and/or repair the hard disk 1200. It is understood that, in some embodiments, the repair utility 1420 can check at least one system file in the hard disk 1200, and repair the system file. It is noted that, in some cases, the drivers for the hardware of the electronic device in the memory device 1400 can be also read and reinstalled. In some embodiments, when the repair utility 1420 is executed, the repair utility 1420 can connect to a server via a network according to a predefined URL (Uniform Resource Locator). The server can be set up and maintained by a manufacturer of the electronic device. The server can perform on-line virus scan and/or system repair for the electronic device via the network.

When the check and/or repair is completed, in step S408, the check result of the hard disk 1200 is stored, displayed via a display unit (not shown) of the electronic device, and/or transmitted to the server corresponding to the manufacture of the electronic device via the network. It is understood that, the check result may be related to details of actions performed by the repair utility 1420, the check and repair result of the system file, and/or notices for users when the repair of the hard disk 1200 cannot be completed. Users can view the related information of the repair when they see the check result. When the manufacture receives the check result from users via the server, the check result can be recorded, and/or related utilities or materials required for repair can be prepared in advance, thereby speeding up the repair procedure. In some embodiments, when the system repair for the hard disk 1200 is completed, the BIOS 1100 can reboot the electronic device according to the original OS in the hard disk 1200.

It is understood that, similarly, in some embodiments, when the hard disk 1200 cannot be detected by the BIOS 1100, the embodiment in FIG. 4 is performed. Additionally, in some embodiments, the boot system 1000 can further comprise a temperature sensor to detect the temperature of the hard disk 1200. When the temperature of the hard disk 1200 exceeds a predefined value, the embodiment in FIG. 4 is performed. Further, in some embodiments, the BIOS 1100 can provide a multi-boot menu. Users can select a location, such as the hard disk 1200 or the memory device 1400 to boot the electronic device via the multi-boot menu. When the memory device 1400 is selected, the embodiment in FIG. 4 is performed.

Therefore, the boot systems and methods can directly boot an electronic device using a memory device coupled to an IO chip of the electronic device. Since the IO chip is a necessary component of the electronic device, such as the computer system, the cost for preparing a recovery disc or adding capacity to a hard disk required for system recovery in conventional practices can be reduced. Additionally, the response and repair time can be shortened when users face computer malfunctions, thus increasing satisfaction of users.

Boot systems and methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to a specific logic circuit.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system for use in an electronic device, comprising:
   an IO (Input/Output) chip;
   a first storage device coupled to the IO chip, comprising at least a OS(operation system);
   a temperature sensor for detecting a temperature of a second storage device;
   a BIOS (Basic Input/Output System), wherein, when the temperature of second storage device exceeds a predefined value, the BIOS reads the OS from the first storage device via the IO chip and performs an action based on the OS.

2. The system of claim 1, wherein the first storage device is a hard disk, a solid state disk, a memory or a combination thereof.

3. The system of claim 1, wherein the second storage device is a hard disk, a solid state disk, a memory or a combination thereof.

4. The system of claim 1, further comprising a repair utility, the OS further reads and executes the repair utility to check the second storage device.

5. The system of claim 4, wherein the repair utility further transmits a check result corresponding to the second storage device to a server via a network, or displays a check result corresponding to the second storage device on a display.

6. The system of claim 4, wherein when the repair utility is executed, the repair utility checks at least one system file in the second storage device, and repairs the system file.

7. The system of claim 1, wherein the IO chip comprises a super IO or a keyboard controller.

8. The system of claim 1, wherein the BIOS further comprises a multi-boot menu used for selecting the first storage device, wherein when the first storage device is selected, the BIOS reads the OS from the first storage device via the IO chip, and boots the electronic device based on the OS.

9. The system of claim 1, wherein the action comprises booting the electronic device.

* * * * *